US011915526B2

(12) United States Patent
Furu et al.

(10) Patent No.: US 11,915,526 B2
(45) Date of Patent: Feb. 27, 2024

(54) CHARGING SYSTEM

(71) Applicant: AFFIN AS, Oslo (NO)

(72) Inventors: Harald Furu, Oslo (NO); Olav Eimstad, Oslo (NO)

(73) Assignee: AFFIN AS, Oslo (NO)

(*) Notice: Subject to any disclaimer, the term of this patent is extended or adjusted under 35 U.S.C. 154(b) by 374 days.

(21) Appl. No.: 17/290,783

(22) PCT Filed: Oct. 28, 2019

(86) PCT No.: PCT/NO2019/050235
§ 371 (c)(1),
(2) Date: May 3, 2021

(87) PCT Pub. No.: WO2020/096460
PCT Pub. Date: May 14, 2020

(65) Prior Publication Data
US 2022/0005289 A1    Jan. 6, 2022

(30) Foreign Application Priority Data

Nov. 7, 2018   (NO) .................................. 20181431
Nov. 26, 2018  (NO) .................................. 20181518

(51) Int. Cl.
G08G 1/00       (2006.01)
G08G 1/065      (2006.01)
(Continued)

(52) U.S. Cl.
CPC .......... G07B 15/063 (2013.01); B60L 53/665 (2019.02); G06Q 50/40 (2024.01)

(58) Field of Classification Search
CPC ..... G07B 15/063; B60L 53/665; G06Q 50/30; G06Q 30/0205; G06Q 30/0284;
(Continued)

(56) References Cited

U.S. PATENT DOCUMENTS 5,767,505 A    6/1998   Mertens
8,065,181 B2   11/2011  McNew
(Continued)

FOREIGN PATENT DOCUMENTS

CN    101447126    6/2009
CN    103839298    6/2014
(Continued)

OTHER PUBLICATIONS

Opposition letter from Q-FREE ASA filed in Norwegian Patent No. 344693, May 23, 2022, pp. 1-23, corresponding to U.S. Appl. No. 17/290,783, publication No. 2022-0005289.
(Continued)

Primary Examiner — Toan N Pham
(74) Attorney, Agent, or Firm — Jeffrey S. Melcher; Melcher Patent Law PLLC

(57) ABSTRACT

A vehicle fee charging system and method is disclosed for a vehicle driving from a first point A to a second point B. It (10) comprises a central management system (12) adapted to calculate the fee based on a dataset. It comprises a first unit (50) adapted to record a first information data set (51) based on the vehicle type in question. The first information data set (51) comprises information such as fuel type, category of the vehicle and the authorization of the vehicle. The system (10) further comprises at least one base station/monitoring system (22) collecting second information dataset (52) of the selected route from A to B. The dataset comprises at least the first (51) and the second (52) data information set and said datasets are recorded by the central management system (12) configured to calculate a fee for said vehicle based on said information.

5 Claims, 4 Drawing Sheets

(51) Int. Cl.
G07B 15/06 (2011.01)
B60L 53/66 (2019.01)

(58) Field of Classification Search
CPC . G06Q 30/0206; Y02T 10/70; Y02T 10/7072; Y02T 90/12; Y02T 90/16
See application file for complete search history.

(56) References Cited

U.S. PATENT DOCUMENTS

| | | |
|---|---|---|
| 10,726,403 B2 * | 7/2020 | Aggarwal ............... G06Q 50/30 |
| 11,276,253 B2 | 3/2022 | Molmann |
| 2010/0076878 A1 | 3/2010 | Burr |
| 2011/0218896 A1 * | 9/2011 | Tonnon ................ G06Q 20/085 |
| | | 705/31 |
| 2013/0006725 A1 | 1/2013 | Simanek |
| 2015/0088618 A1 * | 3/2015 | Basir .................... G07B 15/063 |
| | | 701/1 |
| 2015/0235478 A1 | 8/2015 | Blandin |
| 2015/0279122 A1 | 10/2015 | Lorenzen |
| 2016/0203651 A1 | 7/2016 | Heath |
| 2019/0164357 A1 | 5/2019 | John |
| 2021/0201281 A1 | 7/2021 | Molmann |

FOREIGN PATENT DOCUMENTS

| | | |
|---|---|---|
| CN | 103854313 | 6/2014 |
| CN | 104658045 | 5/2015 |
| CN | 104091440 | 3/2016 |
| CN | 105488857 | 4/2016 |
| CN | 107067719 | 8/2017 |
| WO | 2017/176122 | 10/2017 |

OTHER PUBLICATIONS

International Search Report Issued in PCT/No. 2019/050235, dated Dec. 17, 2019, pp. 1-3.
Written Opinion Issued in PCT/NO2019/050235, dated Dec. 17, 2019, pp. 1-3.

* cited by examiner

CHARGING SYSTEM

FIELD OF THE INVENTION

The Present invention relates to a vehicle fee charging system. More particularly, the invention relates to a system and method for charging fee for vehicles which are participating in the traffic on the road.

BACKGROUND OF THE INVENTION

With rapid urbanization, the number of vehicles on roads continue to grow, traffic congestion and pollution is becoming more problematic than before. There has been serious traffic congestion increase on the urban roads, that not only hinders people's daily lives, but also affects environmental pollution and causes accidents, thereby posing a serious health hazard to people's lives.

The governments are exploring new technology to ensure traffic safety and avoid traffic congestion. Various measurements are taken to detect and monitor the traffic congestion and many systems and methods are developed for detecting pollution levels in real time. With the increasing use of vehicles, traffic congestion on urban roads is on the increase, environmental concerns on the increase, therefore a new monitoring and real time cause and effect system needs to be developed and deployed to enable a long term solution to the problems.

For the environment, there is a need to manage the traffic flow on a road network and to keep the air pollution due to exhaust gases and particulate airborne pollution (PM10) from vehicles below a specified value. For this, many parameters which are dependent on traffic density/traffic flow or which represent traffic density/traffic flow have to be measured and evaluated.

Further to control the traffic congestion and pollution generated by the vehicles, governments have introduced several rules and directives. In some cases, in order to achieve proper transportation demand management and easing the traffic congestion, a relevant fee charging system is being applied by many governments. The aim is to use the vehicle's fee charging mechanism to limit road traffic density, to achieve the purpose of easing urban traffic congestion, and improve operational efficiency of the entire urban transportation system.

The traffic congestion fees or traffic-related fees differ from customary toll fees, the customary toll fees have to be paid by every road user for merely using a road, whereas traffic-related fees have to be paid on its own or in addition to the customary toll fees by a road user given the occurrence of an exceptional traffic event in which a plurality of vehicles are involved.

Therefore, by charging traffic congestion fees on vehicles entering the congested roads, the traffic pressure will be eased, and traffic density will be reduced, thereby controlling the pollution level on the roads.

There are some vehicle fee charging systems and methods known in the prior art.

U.S. patent application Ser. No. 14/436,454 discloses a toll system for collecting traffic-related toll fees from the vehicles on a route section which are involved in the increased traffic density and/or air pollution on the respective route section sections.

Chinese Patent application no. CN104658045A discloses urban road congestion fee charging system, which includes a camera module, a vehicle detector, a communication module, a processor, a database, a memory, GPRS communication module, display module, a license plate recognition module, data processing module and billing module. The system charges the vehicles which entering the traffic jam areas, so that the traffic pressure is alleviated.

Chinese Patent no. CN104091440B discloses a method to estimate the cost of urban traffic congestion and road grade based on the type of vehicle.

Chinese Patent application no. CN103854313A discloses road traffic jam fee charging system for a restricted area.

Chinese Patent application no. CN103839298A discloses a. road traffic jam fee charging system which is mainly composed of a regional detection system, a control and management central system and a background processing system, wherein the regional detection system is provided with a detection device capable of entering the region for information collection, the control central system comprises a license plate identification system, a data processing system and a jam fee calculating system, and the background processing system is a platform arranged for fee payers and comprises a bill printing system, a paying detail printing system and details of the transaction.

Chinese Patent application no. CN107067719A discloses a system which includes an exhaust emission fee settlement platform arranged in a traffic management department and household vehicles which keep communication connection with the exhaust emission fee settlement platform.

Chinese Patent application no. CN105488857A discloses a vehicle fee collection management system. The system includes an image acquisition device used for acquiring vehicle images, an information acquisition device used for acquiring the vehicle information, and an image processing device for analyzing the vehicle images acquired by the image acquisition device, realizing vehicle positioning, license plate extraction, license plate recognition and information output, comparing the vehicle information acquired by the information acquisition device with analyzed vehicle image information, performing correction, and submitting corrected vehicle information to a fee collection charge settlement system.

Chinese Patent application no. CN101447126A discloses a method for improving urban traffic jam, in which the vehicle is examined monthly with travel miles in urban roads, and the vehicles exceeding the mileage limit are additionally charged with substantive fees for urban road use and fees for disposing tail gas pollutants.

The problem is that the prior art systems and methods are merely based on the assumption of traffic flow data. The systems and methods are not automated in real time based on traffic flow and fees are not updated in real time. Additionally, it is possibly unreasonably to demand increased fees from vehicles using a road section preceding the overloaded route section. Further, the fee system should be charged based on vehicle types and road conditions. Also, the number of passengers in the vehicle should be considered for the charging traffic-related fees.

Further, the problem with providing an alternate route for traffic diversions for each vehicle is that it could lead to an influx of a lot of the vehicles on the same section of the road, resulting in new traffic jams, and extending vehicle driving time.

Moreover, the prior art system and method provides for a vehicle to travel the route selection based on time, without taking into account the preferences of more indicators, resulting in the lack of flexibility of individual choice.

Therefore, the purpose of the present invention is to solve or reduce at least one of the problems above while retaining the benefits of prior art. Specifically, the proposed solution should reduce road traffic in polluted areas significantly without banning certain vehicles. To direct traffic flow according to local and state government rules and directives it will be advantageous for the authorities to have an interactive method for observing how traffic flow and pollution levels change when traffic directives change. This will enable authorities to make decisions based on facts, not assumptions. Further, based on vehicle fee charging system, an individual path of the vehicle is routed; or to choose the route of the vehicle and the road network through an interactive system to reduce traffic congestion and therefore pollution on the particular segment of the road.

Further, the inventive fee system will see to that a vehicles effect on the environment due to the chosen fuel, type of transport device, and the purpose with the drive is paying a fee considering this.

SUMMARY OF THE INVENTION

The present invention solves the technical problems and deficiencies in the prior art, by providing a vehicle fee charging system, which will ease traffic congestion caused due to the large traffic volume. Further, it will improve urban air quality and minimize the negative effect on global climate through a fair, comprehensive and flexible vehicle fee charging system. The invention will also create an improved vehicle insurance payment system, since relevant data easily can be included in the same setup.

In order to improve air quality, e.g. reduce concentrations of substances that are harmful to humans in an urban area, it may be desirable to reduce road traffic, in particular the number of private cars used for commuter traffic in the urban area. A simplified vehicle fee charging system based on traffic events and considering other factors including pollution level, vehicle types, road condition and passenger discount fee based on number of passengers may help.

The present invention provides the vehicle fee charging system based on current traffic events and road conditions. The invention simplifies the collection of toll fees. At the same time, fee calculation is made fairer by considering social situations and society characteristics. Toll fees can also be calculated based on driving distance and the route taken. All necessary privacy issues are securely handled.

The system may direct traffic flow according to local and state government rules and directives. It will be advantageous for the authorities to have an interactive method for observing how traffic flow and pollution levels change when traffic directives change. This will enable authorities to make decisions based on facts, not assumptions. At the same time, the effect on road-users or groups of road-users regarding time spent in traffic and related fees can be seen and it will achieve pollution and climate-related targets and at the same time enable the paying road-users to experience more flexible traffic dynamics.

In one aspect, a vehicle fee charging system is provided for calculating a fee for a vehicle when driving from a first point A to a second point B. The system comprises a central management system adapted to calculate the fee based on specific data set, a first unit is adapted to record a first information data set based on the vehicle type in question, said first information data set comprises information such as fuel type, category of the vehicle and the authorization of the vehicle, the system further comprises at least one base station/monitoring system collecting a second information dataset of the selected route from A to B, said dataset comprises at least the first and the second data information set and said dataset is recorded by the central management system configured to calculate a fee for said vehicle based on said information.

According to the invention the base station is a traffic control and monitoring system and that it comprises at least one multiple intersections points on the route from A to B.

Fuel type could be diesel, gasoline, electricity, gas. The fee may depend on this. By category of vehicle is to understand whether it is a private car, truck, motorcycle, scooter etc. The fee will depend on this as well as the "authorization of the vehicle". By this expression is to understand what authority/charge the driver/vehicle has. If it is for instance an ambulance or the police it is possible to reduce the fee. Perhaps make it zero.

The first unit may be placed in the vehicle or be a part of the central management system and information related to the first information data set may be programed before the very first drive, as this information is not changed during use. Moreover, if they are, the first unit will be re-programmed. The first information data set is then paired with the second information data set, which depends on the selected route. Based on that an appropriate fee is calculated.

The system includes a base station at multiple intersection points on the road for detecting traffic events on a road, a pollution detection system for measuring a substance concentration in ambient air, whereas a central management system is configured to charge fees for the exceptional traffic to a vehicle moving on a selected route on the road, when an exceptional traffic event is detected and when the substance concentration exceeds a threshold value and the interactive interface display is configured to inform the driver of an increased fee on the selected route.

In another aspect, the system further comprises a time registration unit for recording time data being time of day the vehicle is driving from A to B. Said time data set is sent to the central management system configured to calculate the fee also based on time data.

The fee is then a function of what time of the day the driver is driving. If the driver is using the vehicle during a period of heavy traffic, the fee will be larger compared with the situation outside rush hour.

In another aspect, the system provides traffic related fee comprising dynamic fees depending on the traffic events, type of vehicles, road conditions and the substance concentrations in ambient air.

In another aspect, the system further comprises a secure device and that the central management system is adapted to send information of dataset and/or of the calculated fee to the secure device placed in said vehicle, said secure device is adapted to store data received from the central management system.

In another aspect, the system further comprises a user terminal to which a user of the vehicle has access and said user terminal is adapted to disclose information of the fee if or when travelling from A to B.

Further, in the system, the driver is provided with driver's personal identifier that can be logged/driving license scanned prior to the start of the journey and taken into consideration when calculating fees.

In another aspect, the base station is a traffic control and monitoring system, comprising at least one, preferable multiple intersections points on the route from A to B.

In another aspect, the system further comprises a positioning system placed in the vehicle—such as a GPS—sending information data set to the central management system, providing the exact position of the vehicle as a function of time and the position data set is used in said central management system for calculating the fee.

In another aspect, the system further comprises sensors—such as an emission sensor and/or odometer, and/or noise sensor, and/or fuel level sensor—placed in the vehicle, said sensors are sending data related to the sensors registrations universe and said data are used for calculating the fee rate.

A registrations universe of the sensors is the special parameter the sensor in question is recording. For instance, for the noise sensor, it is the decibel level and for the fuel level sensor, it is the amount of fuel used.

Another aspect of the invention provides a method for calculating a fee for a vehicle when driving from a first point A to a second point B using a system comprising a central management system calculating the fee based on a dataset received from at least a first unit, the first unit records a first information data set based on the vehicle type in question, said first information data set comprises information such as fuel type, category of the vehicle and the authorization of the vehicle, and the dataset is sent to the central management system, second information data set comprising registration of multiple intersection points on the route from A to B is sent to the central management system, and the central management system is saving said data sets on which fees are calculated.

In another aspect of the invention, the system is recording which time of the day the vehicle is driving from A to B and the time data set is sent to the central management system and used for calculating the fee.

In another aspect of the invention, the management system is sending the saved datasets and/or the calculated fee based on the datasets to a secure device placed in the vehicle which is storing the data.

The invention also concerns use of the system according to the invention as explained above for performing the method.

Another aspect of the invention provides a method for charging a traffic-related fee for a vehicle on a road by detecting traffic events in a route on the road by a base station, measuring a substance concentration in ambient air by pollution detection system, generating report in real time about the traffic events, wherein the interactive interface display is configured for authorities to observe traffic events and pollution levels change when traffic event change, and a central management system configured to charge a traffic related fee to a vehicle moving on a selected route on the road, when an exceptional traffic event is detected, and the pollution concentration exceeds a threshold value.

The system and method can accurately determine the state of traffic congestion within the current area, take range of applications within the network and the internet in a timely manner and simultaneously release the current state of congestion, increasing the driver's route choice by charging the traffic-related fee to reduce traffic within a certain period of the traffic congestion state.

In another aspect, the present invention is to provide a method for estimating the traffic-related fee for urban traffic congestion by real time sorting of urban traffic flow, vehicle speed, road mileage data, pollution levels and time spent on the road.

BRIEF DESCRIPTION OF THE DRAWINGS

The invention may be better understood by reference to one or more of these drawings in combination with the detailed description of specific embodiments presented herein.

DETAILED DESCRIPTION OF THE INVENTION

In the following description, numerous details are set forth to provide an understanding of the present invention. However, it will be understood by those skilled in the art that the present invention may be practiced without these details and that numerous variations or modifications from the described embodiments are possible.

The implementation and management of traffic congestion will improve urban air quality and minimize the negative effect on global climate through a fair, comprehensive and flexible vehicle fee charging system. It is advantageous to consider environmental impact issues. For example, the vehicle fee charging system may include a goal to increase the green nature or earth/environment friendliness of a regional or national transit system.

NO20160540 A1 and NO20160003 A1 disclose a system for controlling road traffic, which are referenced in the present invention, based on that the present invention will be described in detail. NO20160540 A1 discloses a system for controlling road traffic, comprising a display for informing a vehicle's driver, a measurement station for measuring a substance concentration in ambient air and a central system. The central system is configured to charge a pollution fee to a vehicle moving in a pollution zone with predetermined geographical boundaries when the substance concentration in the pollution zone exceeds a threshold value. The display is configured to inform motorists of a raised pollution fee in the pollution zone.

NO20160003 A1 a system and a method for charging fees for a vehicle. The system comprises a central system. A secure device is mounted in the vehicle and is configured to receive, process and store fee data. The fee data includes any fee related data, e.g. a registration number, size and type of vehicle etc. Accordingly, fee rates are charged for emission of fossil carbon, NOx or SOx.

The present invention expands these ideas and propose fees based on traffic events and considering other factors including pollution level, vehicle types, road condition and passenger discount fee.

Figure 1:
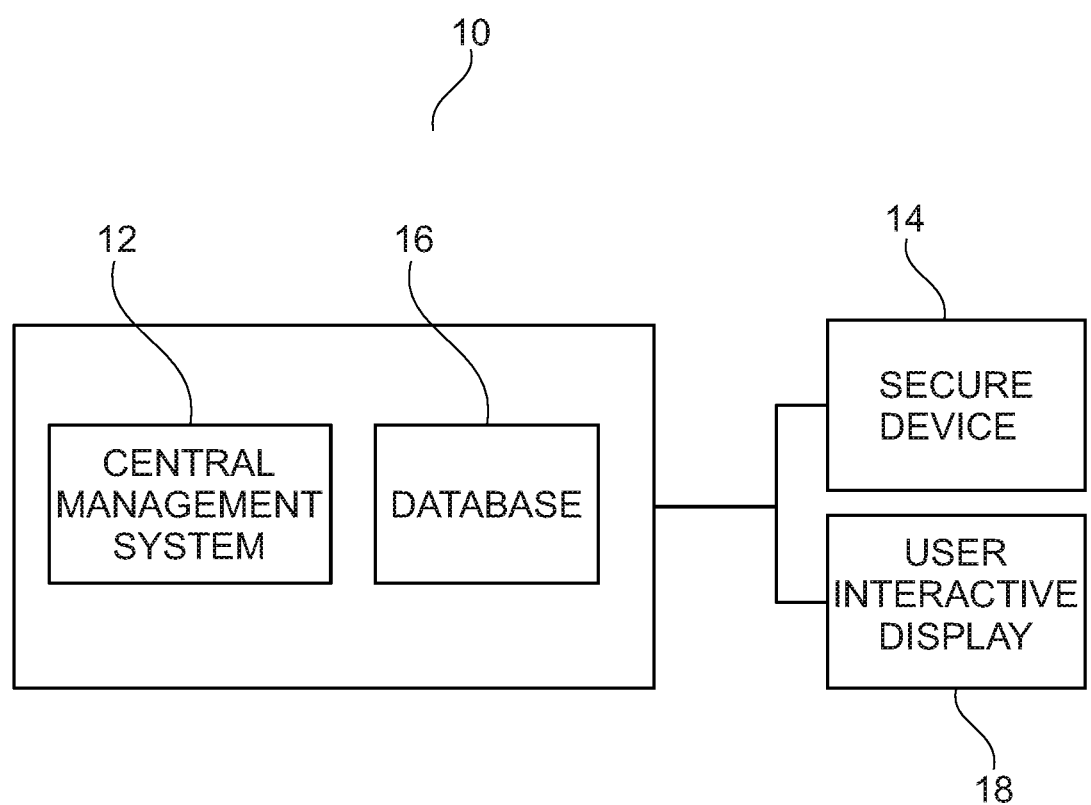
FIG. 1 illustrates a vehicle fee charging system according to an embodiment of the present invention.

FIG. 1 illustrates a vehicle fee charging system 10, the system 10 includes a central management system 12 and a secure device 14 that can be mounted in a vehicle. The central management system 12 has a database 16 for acquiring and storing fee data and reporting other associated functions. Proven cryptographic techniques ensure that the origin of fee data can be assured without manual control. These techniques also ensure that no one, including the vehicle owner, can alter fee data in transit from the secure device 14. While the system 10 requires a private key for each vehicle, there is no need for a central repository of private keys.

Figure 2:
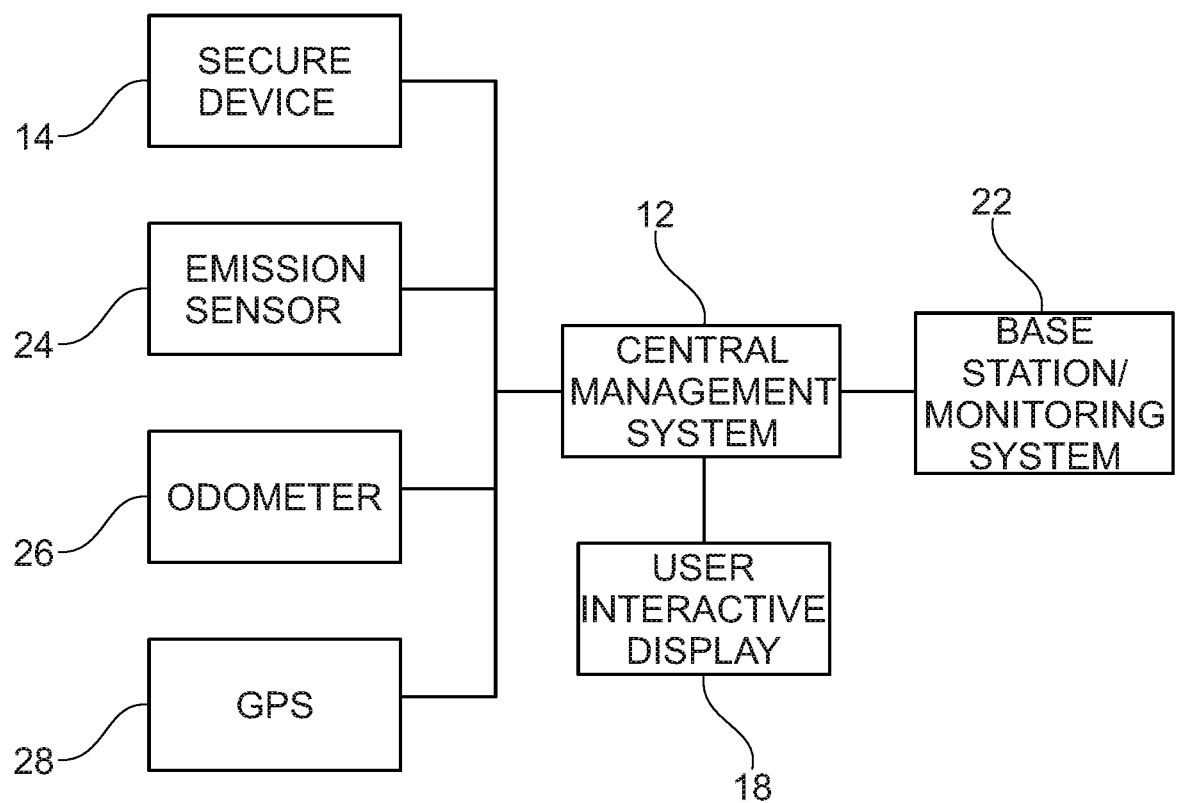
FIG. 2 provides a block diagram representing the principles of the system according to an embodiment of the present invention.

Further as shown in FIG. 2, the central management system 12 transmits fee data to the secure device 14 based on information collected from at least one base station/ monitoring system 22 of the selected route, emission sensor 24, an odometer 26 and a positioning system 28, e.g. GPS. A user terminal 18 is an interactive interface display system, e.g. a car console, smartphone, tablet or PC displaying fee data to the vehicle owner but does not permit changing the data. The central management system 12 collect the traffic data from the predetermined boundaries or area or selected route. Further, the emission sensor 24 measures real-world emissions in the exhaust of the vehicle. This implementation enables charging fees based on fact of traffic congestion and pollution level.

The positioning system 28 provides data to the secure device 14, whereas an ANPR-system, e.g. an electronic toll station, records a time and location for the vehicle in a central management system 12. The central management system 12 may compute the relevant fee from the information collected from the base station/monitoring system 22 of the selected route, emission sensor 24, an odometer 26 and a positioning system 28, e.g. GPS and provide the resulting fee over the network.

The system 10 is configured with ANPR systems and a control centre commonly found in traffic information or control systems.

In one embodiment, the present invention describes a system 10 for improving urban traffic congestion, a vehicle is equipped with a secure device 14 which is configured with central management system 12. Further central management system 12 is configured with the base station/monitoring system 22 on the road. The base station/monitoring system 22 is provided with traffic control system at each intersection point on the urban roads.

In another embodiment, the present invention provides a method of improving the traffic congestion on urban roads, the fee data is transmitted to a vehicle from the central management system 12, while location and time information is issued to the onboard odometer 24, positioning system 28 on each vehicle. The central management system 12 is responsible for data exchange with each vehicle.

Based on the traffic congestion on the road, a variable fee rate schedule is created comprising a plurality of different rate values, the rate values being a function of occupancy count and vehicle's type.

Further, user terminal 18 is an interactive interface display where the driver's personal identifier can be logged/driving license scanned prior to the start of the journey and taken into consideration when calculating fees. In similar manner, this can be applied to passengers. The system could then see, for instance if it is a single mother driving her own vehicle and calculate fees on that basis. The authorities could specify a maximum fee for certain groups or decide to exempt certain groups altogether.

The number of passengers in the vehicle should be considered when charging traffic-related fees in the context of the present invention are described in the patent application NO20160541 A1. NO20160541 A1 concerns a system for counting passengers in a vehicle. The system comprises a public server for recording a journey ID and an associated passenger count, a vehicle server within the vehicle and a machine-readable passenger token for providing a passenger ID unique for each passenger. The public server and the vehicle server are nodes in a public network. The public server is configured to record the passenger count as the number of distinct passenger IDs that is/are read by the vehicle server over a short-range connection during a journey identified by the journey ID.

Further, the authorities or government can apply different fee rates for different classes, e.g. higher fee rates for private cars than for utility vehicles and zero fee rates for emergency vehicles. The fee rates may be further divided by secondary criteria, e.g. 'type' reflecting weight, the environmental footprint of manufacture or road types and road conditions. The fee rates are a function of usage data, e.g. mileage or real-world emission. The resulting fees are, for example, useful for implementing policies.

Figure 3:
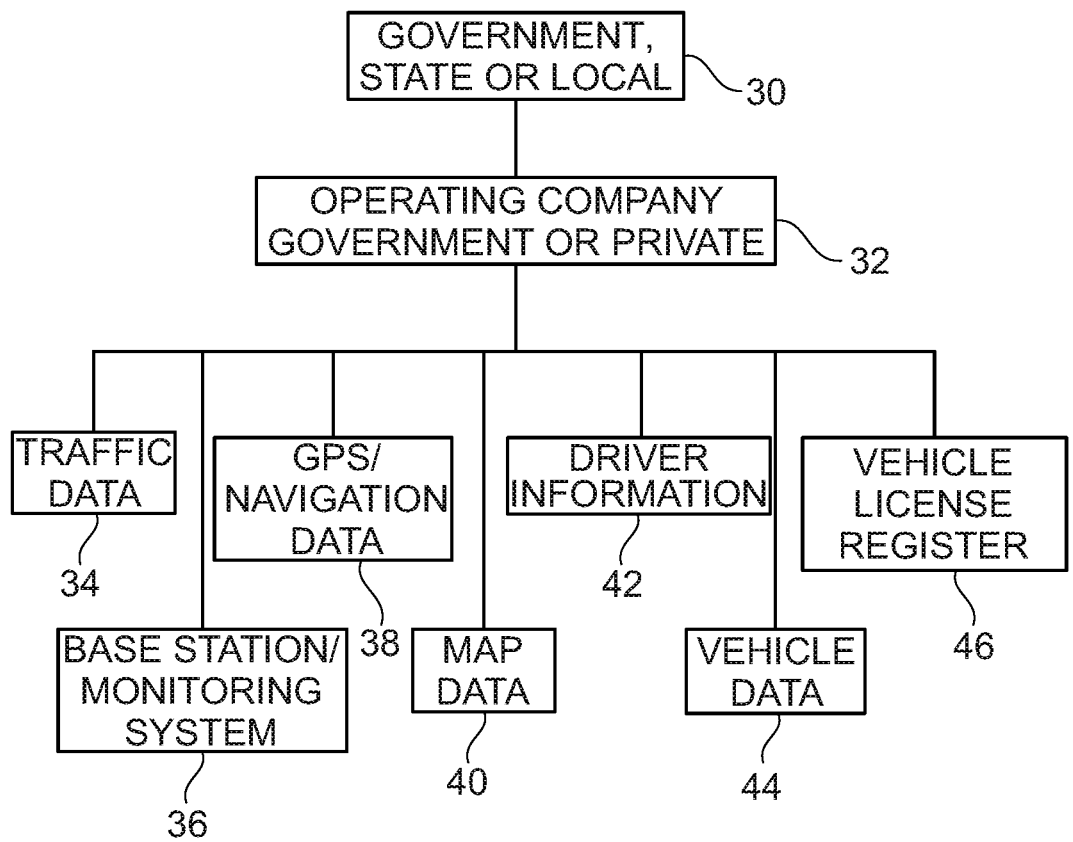
FIG. 3 is a schematic block diagram of the present invention.

FIG. 3 The flow flow diagram illustrates representing the present invention, the system 10 is being used by the government, state or local authorities 30. It can also be used by the traffic operating companies either government or private companies 32. The system 10 provides traffic data 34, base station/monitoring station data 36, driver information 42, vehicle data 44, positioning data 38, map/navigation data 40 and driver information 46 into a single integrated interface for the authorities to have an interactive method for observing how traffic flow and pollution levels change when traffic directives change.

In another embodiment, the present invention expands these ideas and propose fees based on air-pollution, i.e. concentrations of certain substances in ambient air. The system 10 will charge the fee based on the Pollution level ($CO_2$, NOX) and weather condition. However, the system 10 is not limited to certain pollutants, and may reduce emission of $CO_2$ or other climate gases if desired.

Again, the fee rates depend on properties of the vehicle. For example, there may be separate classes for private passenger cars, utility vehicles with an approved need to deliver goods, public transport vehicles and emergency vehicles such as police cars, fire trucks and ambulances. Each class may have different fee rates. For example, a private car may be assigned a higher fee rate than a utility vehicle, and the fee rate may be zero for emergency vehicles. The vehicle may be eligible for additional fees based on other criteria, e.g. type of vehicle. For example, a van and a lorry for delivering goods to shops in a central area have different weights, and thus contribute differently to tarmac abrasion and concentrations of PM10. Thus, weight may be considered when determining the fee rate.

Further, in a vehicle with a secure device 14 installed, a fee rate for private cars stored in the secure device 14 may be a function of the traffic on the road and real-world emission of pollutants measured in mg/km by the emission sensor 24 and an accurate mileage in km provided by the odometer 24.

As mentioned above, the traffic control system may use ANPR to estimate travel times, provide footage from CCTV-cameras and forward any other traffic information, e.g. messages from vehicles regarding local incidents, gridlocks, accidents etc. Real time information is typically provided to driver of the vehicle on variable message signs, by broadcasting, on a website, in a navigation system etc. Accordingly, suitable user terminals also referensed as interactive interface display 18 include a car console, smartphone, tablet, PC and any other devices able to connect to a network, download the information and present it to the driver of vehicle before starting or while driving. The same channels may also provide information regarding traffic congestion, air pollution, in particular raised fee rates and alternative routes in areas where exceptional traffic occurs.

The fees for a certain route will be increased only when road capacity is overloaded, and concentrations of predefined substances exceeds predetermined thresholds. The user unwilling to pay the increased fees may choose alternative routes and hence be inclined to take the shortest and least expensive route.

Alternatively, passengers might be required to register when they enter and when they leave the vehicle. On the other hand, recorded entry and exit locations and times for identifiable passengers would be valuable surveillance data, and thus offer a possibility for misuse.

In one embodiment of the present invention, each passenger has a unique ID-card identifying the owner. Further a card reader may be connected to the secure device 14, e.g. by a USB-cable. A person may insert a personal card into the reader and enter a PIN to verify that he or she is the owner of the card. This prevents someone in a remote location from registering as passenger for a journey.

The unique passenger ID read by the card reader is added to a passenger list for counting passengers as further described below. Some private and public organisations provide machine readable cards, e.g. tickets issued by public transport companies, smart cards for banking applications or secure networking or ID-cards issued by some governments. However, large scale distribution of new smart cards or electronic devices comprising a unique passenger ID for a traffic application is expensive.

While the invention has been described by way of examples, various alternatives and modifications will be apparent to one skilled in the art. The invention is defined by the accompanying claims.

Figure 4:
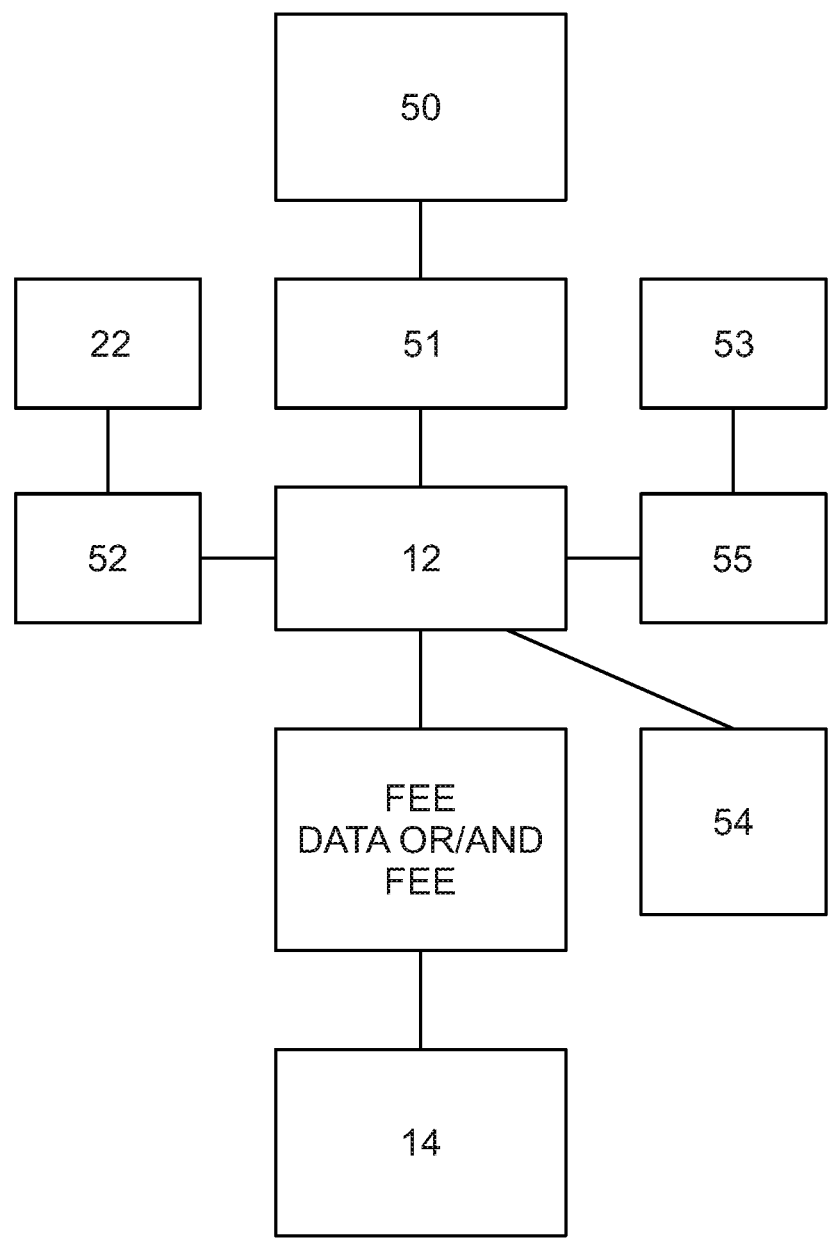
FIG. 4 is a schematic block diagram illustrating a vehicle fee charging system according to an embodiment of the invention.

FIG. 4 is a schematic block diagram illustrating a vehicle fee charging system 10 according to an embodiment of the invention. It comprises a central management system 12 as explained above. Information data set is sent to this from a first unit 50. The first unit is recording a first information data set 51 based on the vehicle type in question. The first information data set 51 comprises information such as fuel type, category of the vehicle and the authorization of the vehicle. The system further comprises the base station/monitoring system 22 collecting second information dataset 52 of a selected route when the vehicle is driving from A to B and sending it to the central management system 12. In this embodiment, a time registration unit 53 for recording time data 55 is a part of the system. It records the time of day the vehicle is driving from A to B. The time data set 55 is sent to the central management system 12 configured to calculate the fee also based on this time data 55. The central management system 12 transmits fee data or the calculated fee to the secure device 14 based on information collected from the above mentioned devices. A positioning system such as a GPS—not shown—being a part of the system may provide the resulting fee over a network.

Further sensors 53 of different kind may also send information to the central management system 12. The sensors 53 are explained above and may be emission sensor and/or odometer, and/or noise sensor, and/or fuel level sensor and/or GPS. Based on the different data input a fee is calculated and the information is delivered to the secure device 14.

The invention claimed is:

1. A vehicle fee charging system for calculating a fee for a vehicle when driving from a first point A to a second point B the system comprises:
a central management system adapted to calculate the fee based on a dataset:
a user terminal in the vehicle, the user terminal comprises an interactive interface display where a driver's personal identifier can be logged and a driving license scanned prior to the start of the journey and configured to send a driver dataset to the central management system;
a first unit adapted to record a first information dataset based on a vehicle type in question, said first information dataset comprises information including at least one of fuel type, category of the vehicle and an authorization of the vehicle;
at least one base station/monitoring system collecting a second information dataset of the selected route from A to B;
at least one sensor in the vehicle selected from the group consisting of an emission sensor, an odometer, a noise sensor, and a fuel level sensor in the vehicle, said at least one sensor is adapted to send sensor dataset to the central management system;
said dataset comprises at least the driver dataset, the sensor dataset, the first information dataset and the second information dataset and said dataset is recorded by the central management system configured to calculate the fee for said vehicle based on said dataset;
a secure device in the vehicle, wherein the central management system is adapted to send information of the dataset and/or of the fee to the secure device, and the secure device is adapted to store data received from the central management system;
wherein the base station is a traffic control and monitoring system and that the base station comprises at least one multiple intersections points on the route from A to B; and
wherein the user terminal is adapted to disclose information of the fee if or when travelling from A to B.

2. The system of claim 1, wherein the system further comprises a time registration unit for recording time data being time of day the vehicle is driving from A to B, said time dataset is sent to the central management system configured to calculate the fee also based on the time dataset.

3. The system of claim 1, wherein the system further comprises a positioning system placed in the vehicle—configured to send information dataset to the central management system informing an exact position of the vehicle as a function of time, and the information dataset is used in said central management system for calculating the fee.

4. A method for calculating a fee for a vehicle by a system when driving from a first point A to a second point B comprising:
providing a central management system for calculating the fee based on a dataset;
logging a driver's personal identifier into a user terminal in the vehicle, the user terminal comprises an interactive interface display;
scanning a driving license into the user terminal;
sending a driver dataset from the user terminal to the central management system;
a first unit recording a first information data set based on the vehicle type in question, said first information dataset comprises information including at least one of fuel type, category of the vehicle and an authorization of the vehicle; and
sending the first information dataset to the central management system;
at least one base station/monitoring system collecting a second information dataset of the selected route from A to B, the second information dataset comprising registration of multiple intersections points on the route from A to B, the base station is a traffic control and monitoring system;
sending the second information dataset the central management system and the central management system;

at least one sensor in the vehicle generating a sensor dataset and sending the sensor dataset to the central management system, the sensor is selected from the group consisting of an emission sensor, an odometer, a noise sensor, and a fuel level sensor in the vehicle;

the central management system calculating the fee based on the dataset, the data set comprising the at least the driver dataset, the sensor dataset, the first information dataset and the second information dataset;

providing a secure device in the vehicle, wherein the central management system sending information of the dataset and/or of the fee to the secure device, and the secure device is adapted to store data received from the central management system; and disclosing the fee on the display.

5. The method of claim 4, further comprising recording a time on a day the vehicle is driving from A to B and sending the time dataset to the central management system and used for calculating the fee.

\* \* \* \* \*